Figure 1:
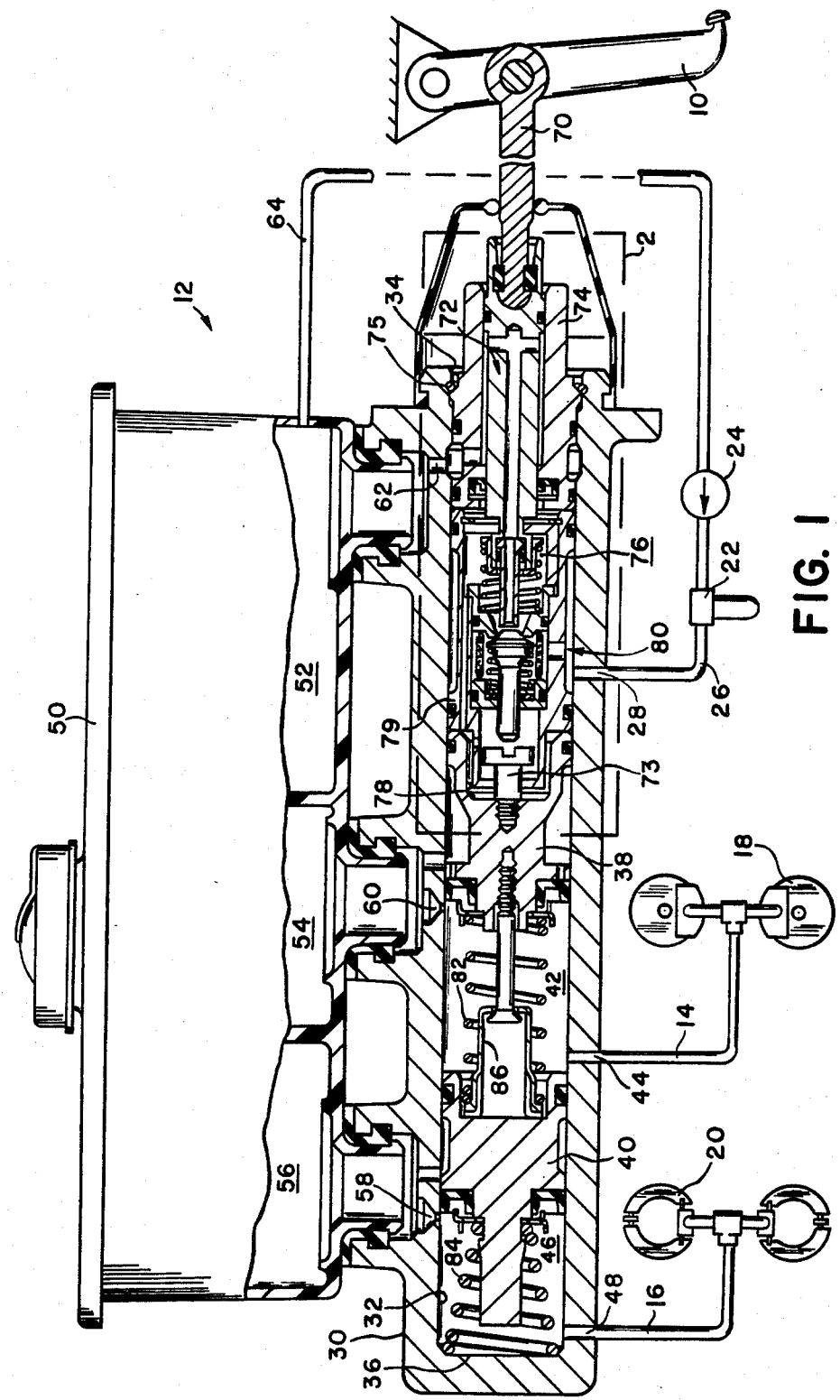

United States Patent [19]

Brown, Jr.

[11] Patent Number: 4,685,297

[45] Date of Patent: Aug. 11, 1987

[54] HYDRAULIC BRAKE BOOSTER WITH QUICK TAKE-UP AND FULL STROKE

[75] Inventor: Arthur K. Brown, Jr., South Bend, Ind.

[73] Assignee: Allied Corporation, Morristown, N.J.

[21] Appl. No.: 793,021

[22] Filed: Oct. 30, 1985

[51] Int. Cl.⁴ .............................................. B60T 13/00
[52] U.S. Cl. ..................... 60/547.1; 60/548
[58] Field of Search ................... 60/547.1, 548, 562

[56] References Cited

U.S. PATENT DOCUMENTS

| | | | |
|---|---|---|---|
| 3,926,093 | 12/1975 | Nakagawa | 60/547.1 |
| 4,196,592 | 4/1980 | Nomura | 60/547.1 |
| 4,433,543 | 2/1984 | Thomas | 60/547.1 |
| 4,435,960 | 3/1984 | Farr | 60/547.1 |
| 4,441,319 | 4/1984 | Brown | 60/562 |
| 4,490,977 | 1/1985 | Fulmer | 60/547.1 |
| 4,514,981 | 5/1985 | Brown et al. | 60/547.1 |

Primary Examiner—Abraham Hershkovitz
Attorney, Agent, or Firm—Larry J. Palguta; Ken C. Decker

[57] ABSTRACT

The brake booster (12) includes a housing (30) with at least one piston (38) disposed in a bore (32) to separate a pressure chamber (42) from a work chamber (76). The piston (38) abuts a valve housing (79) containing therein a valve assembly (80) and the valve assembly (80) is connected to an input assembly (72) abutting the other end of the valve housing (79). The piston (38) and valve housing (79) are joined by connector (73) which permits limited movement of the piston (38) relative to the valve housing (79) before coupling the piston (38) and valve housing (79) together for joint movement.

11 Claims, 2 Drawing Figures

HYDRAULIC BRAKE BOOSTER WITH QUICK TAKE-UP AND FULL STROKE

The present invention relates to a hydraulic brake booster which provides the advantages of both quick take-up of fluid losses in the brakes and full stroke displacement of the pistons by the operatively connected input assembly and brake pedal.

The present invention relates to a booster commonly referred to in the state of the art as a "full power" brake booster, such as those disclosed in copending application Nos. 793,015 now U.S. Pat. No. 4665701; 793,022; and 806,300. In a full power brake booster, an accumulator is charged with fluid pressure for selective use in providing a power assist. The accumulator is communicated to a booster housing and a valve assembly is operable to control communication of fluid pressure from the accumulator to a power chamber wherein the fluid pressure acts against at least one piston to communicate fluid pressure from the housing to a brake circuit. The valve assembly is actuated by an input assembly which controls operation of the valve assembly. U.S. Pat. No. 4,490,977 discloses a full power hydraulic brake booster which includes a resilient block that provides for a small movement of the brake pedal which results in greater movement of the pistons, the brake pedal not following the full movement of the pistons and therefore not providing a full stroke travel of the brake pedal. It is preferable that the vehicle operator be provided with full travel of the brake pedal during the braking application, full travel of the brake pedal having been found to be preferred by vehicle operators because a small brake pedal displacement reduces the vehicle operator's perception of brake system responsiveness. It is also preferable to effect initial travel of the pistons of the brake booster in order to displace fluid through the brake circuits and compensate or take up the fluid losses in the system. In other words, there is an initial portion of the brake pedal stroke which provides little resistance to the vehicle operator because the pistons are initially displacing fluid through the brake circuits which require a certain displacement of fluid before the brakes are fully in operable position to commence braking. It is desirable to use the booster pressure provided by the accuumulator to move the primary and secondary pistons to compensate for fluid losses in the brake lines and brakes, while eliminating the initial displacement of the brake pedal which provides little response or weak reaction force to the vehicle operator. U.S. Pat. Nos. 4,514,981 and 4,441,319 illustrate brake boosters that provide for full stroke travel of the brake pedal in response to a corresponding actuation of the primary and secondary pistons, but having an initial displacement of the brake pedal which provides little resistance to the vehicle operator because of the necessary compensation for fluid losses in the master cylinder, brake lines and brakes. Thus, it is desirable to provide a hydraulic brake booster which provides both (1) an initial displacement of the primary and secondary pistons in order to compensate for system fluid losses without a corresponding displacement of the brake pedal through a short stroke which provides little reaction to the vehicle operator, and (2) provides full stroke travel of the brake pedal corresponding to the displacement of the primary and secondary pistons, instead of a "false travel" wherein the brake pedal travels a short distance while the primary and secondary pistons are displaced a much greater distance during the braking cycle.

The present invention provides a brake booster having a housing with at least one outlet communicating with a brake, a piston movably disposed within the housing between a pressure chamber and a work chamber, an input assembly to control communication of fluid pressure to the work chamber wherein the fluid pressure biases the piston to move from a rest position to a braking position, a valve assembly operable in response to movement of the input assembly, and an inlet formed by the housing to communicate fluid pressure to the valve assembly, characterized in that the brake booster comprises a valve housing disposed between said piston and input assembly and the valve assembly disposed within the valve housing, the valve housing including connection means for permitting limited movement of said piston relative to said valve housing.

The invention will now be described with reference to the accompanying drawings, which illustrate an embodiment of the invention.

Figure 2:
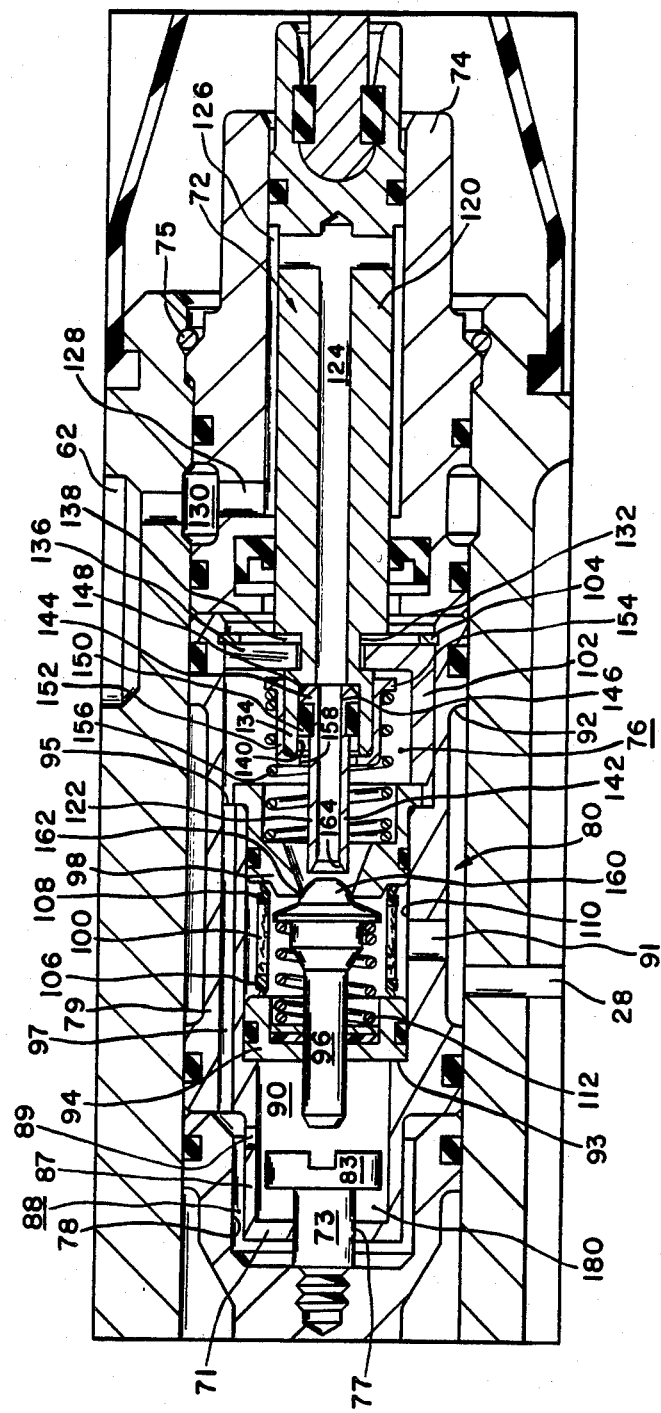

FIG. 1 is a schematic view of a brake system showing the brake booster of the present invention in cross section; and FIG. 2 is an enlarged view of the circumscribed portion 2 in FIG. 1.

A brake system includes a brake pedal 10 connected to a brake booster 12. The brake booster 12 includes conduits 14 and 16 communicating, respectively, with brakes 18 and 20 associated with the vehicle wheels. A fluid pressure source or accumulator 22 is maintained at a predetermined fluid pressure level by a pump 24 and the accumulator 22 is in communication with brake booster 12 via a conduit 26 and brake booster inlet 28. The brake system operates in the conventional manner in that the movement of the brake pedal to an actuated or braking positio results in the brake booster 12 communicating fluid pressure to the brakes 18 and 20.

Brake booster 12 includes a housing 30 with a bore 32 leading from an open end 34 to a bottom wall 36. A primary piston 38 cooperates with the secondary piston 40 and housing 30 to define a primary pressure chamber 42 therebetween which communicates via a first outlet 44 with the conduit 14. The secondary piston 40 cooperates with housing 30 to define a secondary pressure chamber 46 at the bottom wall in communication with the conduit 16 via a second outlet 48.

A reservoir 50 includes three chambers 52, 54, and 56. The chamber 56 communicates via port 58 with secondary pressure chamber 46 when the secondary piston 40 is in a rest position, as shown. The chamber 54 communicates via port 60 with primary pressure chamber 42 when the primary piston 30 is in a rest position. The chamber 52 communicates with the bore 32 via port 62 and also communicates with the pump 24 via conduit 64.

An input member 70 connects with brake pedal 10 and cooperates with a plug 74 to close the open end 34 of bore 32. A snap ring 75 retains the plug within bore 32, and input assembly 72 cooperates with plug 74 to define a work chamber 76 within bore 32 and to the right side of primary piston 38. Primary piston 38 is provided with an rear recess 78 opening toward the work chamber and receiving an end of a valve housing 79 therein. The valve housing 79 receives therein a valve assembly 80 for cooperation with the input assembly in a manner hereinafter described. A spring 82 between the pistons 38 and 40 biases the primary piston 38 to its rest position as shown. A spring 84 between end wall 36 and secondary piston 40 biases piston 40 to its rest position abutting a top hat assembly 86 secured to primary piston 38.

Turning to FIG. 2, the primary piston 38 defines the rear recess 78 which threadedly receives therein a connector 73. Connector 73 includes an enlarged diameter head 83 received within cavity 90 of extension stay valve housing 79. Recess 78 extends about extension 87 to define a clearance 88 that is separate from cavity 90. The stem of connector 73 extends through opening 77 in the end wall 71 of valve housing 79. A clearance 92 of valve housing 79 provides for fluid communication from conduit 28 to opening 91 and valve assembly 80. Valve assembly 80 within valve housing 79 includes a sealing ring 94 with an opening receiving a valve member 96 and a valve seat 98 engages the end of valve member 96 in the illustrated rest position. A filter 100 is disposed between sealing ring 94 and valve seat 98 so that all of the fluid communicated through opening 91 is filtered to remove contaminants therefrom. In order to retain valve assembly 80 within valve housing 79, a sleeve 102 engages valve seat 98 and a snap ring 104 opposes withdrawal of the sleeve. The filter 100 includes resilient end tabs 106 and 108 at each end so that when the snap ring 104 is inserted in the valve housing recess 110, the tabs 106 and 108 are compressed axially to insure a tight fit between sealing ring 94 and valve seat 98. Tabs 106 and 108 also accommodate axial tolerances between sealing ring 94, valve seat 98, and sleeve 102 to relieve these parts of stackup axial tolerances with shoulders 93 and 95. A spring 112 extends between sealing ring 94 and valve member 96 to bias valve member 96 into engagement with valve seat 98. With valve member 96 engaging valve seat 98, fluid pressure communicated through opening 91 is trapped on left side of valve seat 96. The effective area for valve member 98 is equal to the diameter of the valve member extending through the sealing ring so that the valve member is substantially pressure balanced.

The input assembly 72 includes an input rod 120 and an end projection 122. The rod and projection include axial passages 124 leading from work chamber 76 to a plug clearance 126, which in turn communicates with an opening 128 and clearance 130 in communication with port 62 for the reservoir chamber 52. Therefore, in the rest position of the input assembly 72, work chamber 76 is in communication with reservoir chamber 52. The input rod 120 forms a groove 132 adjacent an enlarged head 134. The sleeve 102 is slotted at 136 to permit transverse attachment of sleeve 102 to input rod 120. With the sleeve in the groove 132, an axial clearance or gap 138 is formed between the sleeve and input rod to permit slight relative axial movement therebetween. The enlarged head 134 defines a recess 140 leading to the passage 124 and end projection 122 is disposed within recess 140. End projection 122 forms a small diameter end portion 142 adjacent valve seat 98 and at the opposite end a large diameter portion 144. The large diameter portion separates a groove 146 on the end projection from a tapered edge 148. The groove 146 receives a seal 150. The seal 150 engages the wall of recess 140 to yieldably dispose end projection 122 coaxial with input rod 120. A collar 152 is fitted over the enlarged head 134. The collar 152 forms a flange 154 acting as a spring rest for a spring 156. The spring extends from valve seat 98 to collar 152 to bias enlarged head 134 to a rest position adjacent sleeve 102 and in spaced relation to the valve member 96. The collar forms an opening 158 receiving the end projection within a radial clearance between the wall of opening 158 and the end projection. The diameter of collar flange 154 is larger than the width of the slot 136 so that the sleeve 102 is prevented from separating from rod 120 so long as the collar 152 remains fitted to the enlarged head. The basic construction of valve assembly 80 is the same as disclosed in U.S. Pat. No. 4,514,981 owned by the same assignee as herein and incorporated by reference.

Valve member 96 is engageable with a part spherical edge 162 on valve seat 98. The left end 164 of projection 122 is engageable with spherical end 160 during braking to close passage 124 and move spherical end 160 away from the edge 162. In order to permit end 164 to seek alignment with ball 160, the end projection 122 is capable of pivoting relative to the head 134.

During a brake application, pedal 10 is depressed by the vehicle operator to move input assembly 72 toward primary piston 38. The initial engagement of the vehicle operator's foot with the brake pedal results in a very small initial displacement which causes end projection 122 to engage spherical end 160 to seek a sealing engagement therewith and close communication between work chamber 76 and passage 124. Further slight movement of the input assembly moves spherical end 160 away from the edge 162 so that fluid pressure from accumulator 22 is communicated to work chamber 76 via conduit 26, inlet 28, clearance 92, opening 91, filter 100, and edge 162. The initial surge of fluid pressure through valve seat 98 also results in fluid pressure flowing through shoulder 95 via passage 97 to chamber 90 and recess 78. Cavity 90 receives the pressure via aperture 89 so that the valve member 96 is pressure balanced. The increased fluid pressure acts against recess 78 to move the primary piston to the left against spring 82 and secondary piston 40. The pistons are displaced past their respective compensation ports and compresses fluid within chambers 42 and 46 to displace fluid through the respective brake lines to the brakes and place the brakes in a ready position for the commencement of braking. As the primary piston 38 moves to the left, both the primary and secondary pistons move independently of valve housing 79 because of the gap 180 existing between connector head 75 and end wall 71 of valve housing 79. Thus, boost pressure is utilized to move the primary and secondary pistons in order to compensate for fluid losses in the master cylinder, brake lines and brakes without any corresponding "soft" pedal travel experienced by the vehicle operator. The initial slight movement of the brake pedal results in the hydraulic booster compensating for fluid losses throughout the system and placing the braking system in a ready position to commence braking upon further movement of the brake pedal by the vehicle operator. Upon accomplishing the compensation for fluid losses within the system, the enlarged diameter section 83 of connector 73 engages end wall 71 of housing 79 so that the brake pedal will experience a "full stroke" by the operator during the braking cycle as pistons 38 and 40 pressurize the fluid within respective chambers 42, 46. The input assembly moves with the primary piston and the primary piston pulls the valve housing, valve assembly, and input assembly along, so that there is provided a full stroke displacement of the brake pedal. When a predetermined fluid pressure level is reached in work chamber 76 corresponding to an associated brake pedal input force, the primary piston moves slightly relative to the end projection 122 to re-engage the spherical end 160 with edge 162 to prevent further buildup of fluid pressure in the work chamber. Further braking separates the spherical end 160 from valve seat 98 to increase the communication of fluid pressure to the work chamber. Upon termination of braking, spring 156 biases the enlarged head 134 to abut sleeve 102 in order to re-engage spherical end 160 with the seat 98 and close communication of fluid pressure to the work chamber. Springs 82 and 84 bias the pistons and input assembly to return to their rest positions.

In the event of a failure in the fluid pressure source or in the communication of fluid pressure to the work chamber, the vehicle operator may manually push the input assembly through a distance equal to gap 138 so that the wall of groove 132 engages the right side of sleeve 102, the input assembly then moving the primary and secondary pistons to generate fluid pressure for brakes 18 and 20.

The hydraulic brake booster of the present invention provides the advantages of the previous hydraulic brake boosters while eliminating the disadvantages. First, the booster pressure is utilized to provide displacement of the primary and secondary pistons in order to compensate for fluid losses within the brake system, without requiring any brake pedal displacement during which the vehicle operator experiences little resistance to displacement of the brake pedal. The "soft" stroke displacement of the brake pedal which had been experienced in the prior hydraulic brake boosters has been effectively eliminated while still accomplishing compensation for fluid losses within the brake system. Second, the fluid losses within the brake system have been compensated for without having a "false travel" system wherein the brake pedal travels through a very short stroke while the primary and secondary pistons of the master cylinder experience a much greater displacement. The hydraulic brake booster of the present invention provides a "full stroke" displacement of the brake pedal corresponding to the displacement of the primary and secondary piston so that the vehicle operator may displace the brake pedal through the desired longer stroke during the brake application. This is accomplished by having the primary piston able to move independently of the valve housing for a limited distance, and thereafter the valve housing is coupled to the primary piston and moves therewith. Thus, the initial predetermined movement of the primary piston effects the quick take-up function to compensate for brake system fluid losses, but then the connector head engages the end of the valve housing to pull the valve housing and input assembly therealong so that the vehicle operator experiences a "full stroke" displacement of the brake pedal corresponding to the displacement of the primary and secondary pistons. An advantage of a "full stroke" displacement of the brake pedal is that the vehicle operator is provided with better and improved responsiveness in the low pressure ranges. Additionally, in the manual mode of operation, there are no stroke losses other than the small distance provided by gap 138.

Many variations of the invention described herein are feasible by one skilled in the art, and as such, are intended to fall within the scope of the appended claims.

What is claimed is:

1. A brake booster having a housing with at least one outlet communicating with a brake, a piston movably disposed within the housing between a pressure chamber and a work chamber, an input assembly to control communication of fluid pressure to the work chamber wherein the fluid pressure biases the piston to move from a rest position to a braking position, a valve assembly operable in response to movement of the input assembly, and an inlet formed by the housing to communicate fluid pressure to the valve assembly, characterized in that the brake booster comprises a valve housing disposed between said piston and input assembly and the valve assembly disposed within the valve housing, the valve housing including connection means for permitting limited movement of said piston relative to said valve housing, the valve housing having an extension which extends into a recess in the piston, the extension having a closed end adjacent the piston and defining within the extension a cavity disposed at an end of the valve housing, the recess extending about the extension to define a clearance therebetween that is separate from the cavity, the connection means including a connector extending between said piston and valve housing, the connector extending through an opening in the closed end of the extension to form a slidable connection permitting the limited movement of said piston relative to said valve housing, the limited movement of the piston effecting a quick take-up of fluid losses in the brake, and the connector including an enlarged head received within the cavity, the movement of said piston relative to the valve housing effecting said take-up and an engagement of said enlarged head with the closed end of the extension for conjoint movement of the piston and valve housing.

2. The brake booster in accordance with claim 1, wherein the valve assembly includes a valve member normally closing fluid communication between a fluid pressure source and the work chamber.

3. The brake booster in accordance with claim 2, wherein the input assembly includes an end projection with a passage therein normally communicating the work chamber with a reservoir associated with the brake booster.

4. The brake booster in accordance with claim 3, wherein the end projection is sealingly engaged with the valve member to close the passage when the valve member is moved by the end projection to communicate the fluid pressure with the work chamber.

5. The brake booster in accordance with claim 4, wherein the end projection cooperates with said input assembly to carry a sealing member therebetween, the sealing member sealing said passage from fluid pressure communicated to the work chamber and biasing said end projection to a coaxial relationship with said input assembly.

6. The brake booster in accordance with claim 1, wherein the extension includes an aperture which permits communication of fluid actuation pressure to the cavity so that the valve assembly is pressure balanced, the aperture being separate from the opening in the closed end.

7. The brake booster in accordance with claim 1, wherein the connector is threadably attached to said piston.

8. A brake booster having a housing with at least one outlet communicating with a brake, a piston movably disposed within the housing between a pressure chamber and a work chamber, an input assembly movable within said housing and defining an end of said work chamber, a valve housing disposed between said piston and said input assembly, the valve housing having a valve assembly disposed therein and operable in response to movement of the input assembly to control communication of fluid pressure to the work chamber wherein the fluid pressure biases the piston to move from a rest position to a braking position, the valve assembly including a valve member normally closing fluid communication between a fluid pressure source and the work chamber, the valve housing including an inlet for receiving fluid pressure from said pressure source and communicating the fluid pressure to said valve assembly, and connection means disposed between said piston and valve housing and for permitting said piston to move a limited distance before coupling said valve housing to said piston for movement therewith, the valve housing having an end extension which is received in a recess of the piston, the end extension being substantially closed to define therein a cavity, the recess extending about the extension to define a clearance therebetween that is separate from the cavity, the connection means comprising a connector attached to one of said piston and valve housing and extending through an opening in the other of said piston and valve housing to form a slidable connection between the piston and valve housing, the connector including an enlarged diameter head received within the cavity of said extension, the enlarged head being spaced apart from an end of said extension when said brake booster is in a rest position, and the movement of the piston over the limited distance effecting a quick take-up of fluid losses in the brake.

9. The brake booster in accordance with claim 8, wherein the connector is threadedly attached to said piston and extends through the opening which is disposed within the end of said extension.

10. The brake booster in accordance with claim 9, wherein the input assembly includes an end projection with a passage therein normally communicating the work chamber with a reservoir associated with the brake booster.

11. The brake booster in accordance with claim 10, wherein the end projection is sealingly engageable with said valve member to close the passage when the valve member is moved by the end projection to communicate the fluid pressure source with the work chamber.

* * * * *